(12) United States Patent
Hecht

(10) Patent No.: US 6,749,110 B2
(45) Date of Patent: Jun. 15, 2004

(54) SYNCHRONOUSLY SWEEPING LINE SCAN IMAGER

(75) Inventor: Kurt Hecht, Hartsville, PA (US)

(73) Assignee: Accu-Sort Systems, Inc., Hatfield, PA (US)

(*) Notice: Subject to any disclaimer, the term of this patent is extended or adjusted under 35 U.S.C. 154(b) by 0 days.

(21) Appl. No.: 10/188,571

(22) Filed: Jul. 3, 2002

(65) Prior Publication Data

US 2003/0006285 A1 Jan. 9, 2003

Related U.S. Application Data

(60) Provisional application No. 60/302,857, filed on Jul. 3, 2001.

(51) Int. Cl.[7] .......................... G02B 26/08; G06K 7/10
(52) U.S. Cl. ............ 235/262.22; 235/454; 235/462.23; 235/462.01; 235/462.24
(58) Field of Search ................................. 235/454, 462, 235/462.01–462.49

(56) References Cited

U.S. PATENT DOCUMENTS

| 3,701,098 A | 10/1972 | Acker |
| 5,481,096 A | 1/1996 | Hippenmeyer et al. |
| 5,616,909 A | 4/1997 | Arackellian |
| 5,920,056 A | * 7/1999 | Bonnet ........................ 235/383 |
| 6,135,352 A | 10/2000 | Girotti |
| 6,325,289 B1 | 12/2001 | Mazzone |
| 6,554,189 B1 | * 4/2003 | Good et al. ............ 235/462.01 |

FOREIGN PATENT DOCUMENTS

JP 2000235616 8/2000

\* cited by examiner

Primary Examiner—Daniel A. Hess
(74) Attorney, Agent, or Firm—Volpe and Koenig, P.C.

(57) ABSTRACT

A system for scanning human or machine readable information located on objects moving in a transport direction along a transport path. An imaging device having a first observation path and at least a 1×N sensor array is also provided. A scanning zone is located along the transport path. A rotating sweeping unit is positioned to receive light from the scanning zone and reflect it to the imaging device. The sweeping unit sweeps through the scanning zone along a sweep path. The imaging device captures a plurality of image segments that extend generally across the transport path and are each at least 1×N pixels in size. Movement of the sweeping unit is preferably synchronized to movement of the objects along the transport path.

15 Claims, 4 Drawing Sheets

SYNCHRONOUSLY SWEEPING LINE SCAN IMAGER

CROSS-REFERENCE TO RELATED APPLICATION

This application claims the benefit of U.S. Provisional Application Ser. No. 60/302,857 filed on Jul. 3, 2001.

BACKGROUND

The present application relates generally to an optical scanning system. More particularly, the invention provides a synchronously sweeping image based line scanner with coplanar illumination.

Package monitoring capability is a vital task in modern shipping and inventory control systems. To aid in this task, automated scanning systems have been developed. Due to their simplicity and speed, linear image based scanners (also called line scanners) are used for a large variety of scanning tasks. However, they have inherent limitations which affect their overall efficiency and usefulness in certain applications. One primary limitation of linear image based scanners is the inability to simultaneously focus on objects of varying height as the objects move down a transport path in a non-singulated package flow arrangement. Sufficient depth of field for many types of current scanning systems is also a limitation. Although scanning systems do exist having a sufficient depth of field, these systems are often very costly.

There is a need to provide a scanning system which will quickly and efficiently scan objects of differing heights as they travel down a material handling path in a non-singulated flow pattern. There is a still further need to provide a scanning system which is cost efficient to manufacture.

SUMMARY

The invention comprises a system for scanning human or machine readable information located on objects moving in a transport direction along a transport path. The system includes an imaging device having a first observation path. A scanning zone is located along the transport path. A sweeping unit is positioned to receive light from the scanning zone along a second observation path and to reflect the light along the first observation path to the imaging device. The sweeping unit moves in a manner so that the second observation path is moved across the scanning zone along a sweep path. The imaging device captures a plurality of image segments that extend generally across the transport path. Movement of the sweeping unit is preferably synchronized to movement of the objects along the transport path.

In another respect, the invention comprises a system for scanning human or machine readable information located on objects moving in a transport direction along a transport path. The system includes a profiling device that provides a height profile of the objects moving along the transport path. The system also includes an imaging device having a first observation path and an automatic focusing system. A controller is in communication with the profiling device to receive the height profile. A scanning zone is located along the transport path. The system further includes a sweeping unit that is positioned to receive light from the scanning zone along a second observation axis and to reflect the light along the first observation path to the imaging device. The sweeping unit moves in a manner so that the second observation path is moved through the scanning zone along a sweep path, during which time the imaging device captures a plurality of image segments that extend generally across the transport path. The controller signals the focusing system to adjust the focusing system and optionally zoom as the sweeping unit moves along the sweep path in accordance with the object height profile.

In another aspect, the invention comprises a method of scanning human or machine readable information located on objects. The objects are preferably moving along a transport path in a single direction. Image data is collected from successive sweeps along a sweep path. Each sweep comprises a plurality of image segments successively spaced across a transport path. The collection of image data includes the steps of imaging 1–N successive image segments across a first sweep path, then imaging 1–N successive image segments across a next sweep path that partially overlaps the first sweep path. The image data is then reviewed to recognize human or machine readable code.

BRIEF DESCRIPTION OF THE DRAWINGS

The foregoing summary as well as the following detailed description of a preferred embodiment of the invention will be better understood when read in conjunction with the appended drawings. For the purpose of illustrating the invention, the presently preferred embodiment is shown. It should be understood, however, that the invention is not limited to the precise arrangements shown. In the drawings.

DETAILED DESCRIPTION OF THE PREFERRED EMBODIMENT

The ensuing detailed description provides a preferred exemplary embodiment only, and is not intended to limit the scope, applicability, or configuration of the invention. Rather, the ensuing detailed description of a preferred exemplary embodiment will provide those skilled in the art with an enabling description for implementing a preferred exemplary embodiment of the invention. It being understood that various changes may be made in the function and arrangement of elements without departing from the spirit and scope of the invention.

Figure 1:
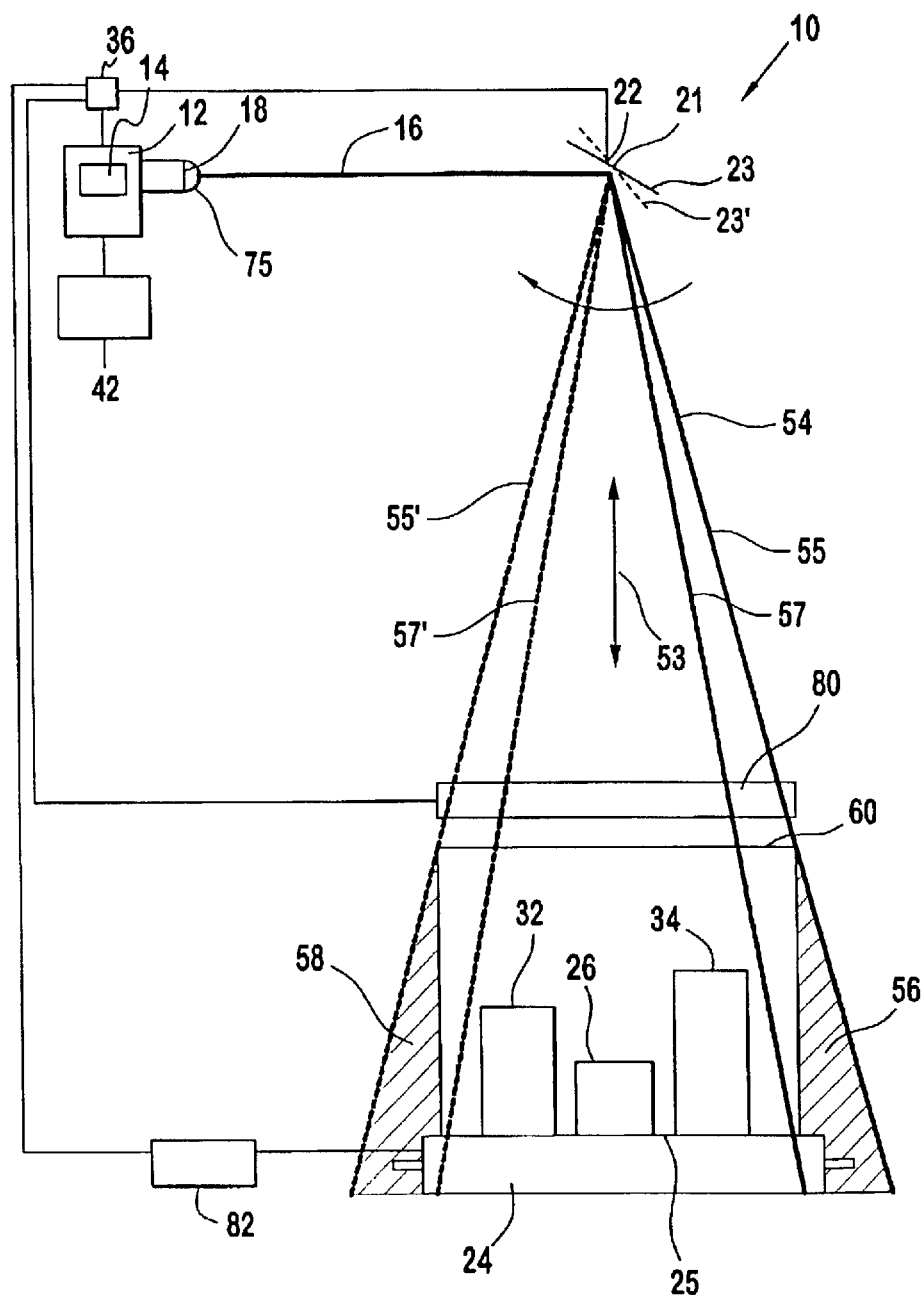
FIG. 1 is a perspective view of a preferred embodiment of the invention.

Referring to FIG. 1, a scanning system 10 in accordance with a preferred embodiment of the invention is shown. The scanning system 10 comprises an imaging device 12, a light source 18, a focusing mechanism 14, a processor 42, a sweeping unit 22, a conveyor 24, a profiling device 80, a controller 36, and a tachometer 82. As will be described in greater detail herein, the scanning system 10 is designed to identify human or machine readable information on the surfaces of objects 26,32,34 in a non-singulated package flow. The scanning system 10 collects image data provided by a series of successive, overlapping sweeps of a scanning zone 50 (see FIG. 3). The processor 42 evaluates the image data for human or machine readable information, such as many differing types of bar code information. The scanning system 10 is also suitable for use in OCR applications. Additionally, the imaging device 12 may be capable of performing low, medium, or high density scanning as required by human or machine readable information on the objects being scanned. In the preferred embodiment, the scanning system 10 has the capability of scanning objects placed at a variety of distances over a depth of field in excess of three feet.

Packages are moved through the system 10 by the conveyor 24 along a transport path 25 in a transport direction 28, which allows placement of objects 26,32,34 in a non-singulated format. Although described as a conveyor 24, those skilled in the art will recognize that other transport devices are equally applicable, such as power actuated rollers, for example. A tachometer 82 is preferably provided to provide data on conveyor speed to the controller 36. Those skilled in the art will recognize that other devices may be used to provide rate of motion input data to the controller 36.

The imaging device 12 is positioned to receive images along a primary observation path 16. In this embodiment, the imaging device 12 is a line scan imager having a 1 pixel×3072 pixel CCD or CMOS linear scan array. Of course, other types of imaging devices having different-sized sensor arrays and/or scan areas could be used. An external memory may also be provided by a processor 42, which is connected to the imaging device 12. The imaging device 12 also has an attached lens 75 which could be an auto focus zoom lens to provide zoom and focus capabilities along a focus axis 53.

The term "observation path" refers to the path between the imaging device 12 and the line or area being scanned. In the case of an imaging device having a 1×N scan area, the observation path would have an essentially planar cross-sectional shape. Alternatively, a non-linear imaging device (i.e., one having an M×N scan area, where both M and N are integers greater than one) would have an observation path having a cross-sectional shape that is more rectangular. The imaging device 12 preferably includes a focusing mechanism 14. In the preferred embodiment, the focusing mechanism 14 is an auto focus type that indirectly receives height profile data (defined below) from the profiling device 80. Those skilled in the art will recognize that focus may be skewed by pitching the sensor within the imaging device 12 (to the left or right with respect to the lens 75) to image objects of different heights crossing the same image segment (defined below) traveling along the conveyor 24.

The profiling device 80 is used to provide a height profile orthogonal to the transport direction 28 of objects moving along the transport path 24. The profiling device 80 is preferably located upstream (i.e. opposite the transport direction 28) of the imaging device 12 and positioned above the conveyer 24. Any suitable profiling device may be used, for example the dimensioning system shown in U.S. Pat. No. 5,661,561 or a Model DM-3000 Dimensioning System manufactured by Accu-Sort Systems, Inc. In this embodiment, the profiling device 80 captures height profile data (also called "height contour data") along strings of points 38, 38', 38" in a profile plane 39 (see FIG. 3). The profiling device 80 is preferably stationary, so successive strings of points 38, 38', 38" are located in the same plane 39. The slant and relative position of successive strings of points reflects movement of the conveyor 24 in the transport direction 28. The frequency in which height profile data is collected along the strings of points 38,38',38" depends upon many factors, including the degree of variation of the height profile in the transport direction 28, the density of objects (packages) on the conveyer 24, and the speed of the conveyer 24, for example. The height profile data is preferably fed to the controller 36. The controller 36 uses the height profile data to control the focusing mechanism 14. As will be discussed in greater detail herein, the height profile data may be used to control operation of the imaging device 12, sweeping unit 22 and/or the conveyor 24.

In this embodiment, a light source 18 is positioned such that illumination generated by the light source 18 is co-axial to the primary observation path 16. The light source 18 is preferably a high-intensity unit capable of providing a structured light beam at sufficient lumens to an object placed at a distance from the imaging device 12. As those skilled in the art will recognize, other non-coaxial lighting sources may also be used to flood the scanning zone with illumination. Optionally, the light source 18 can be modulated as a function of the sweep speed (defined below) and object height to vary the intensity of the produced light. This adjustability allows accurate control of the illumination intensity. Those skilled in the art will also recognize that the intensity of the settings may be varied such that excessive heat and light is avoided which provides for safer working conditions.

Figure 2:
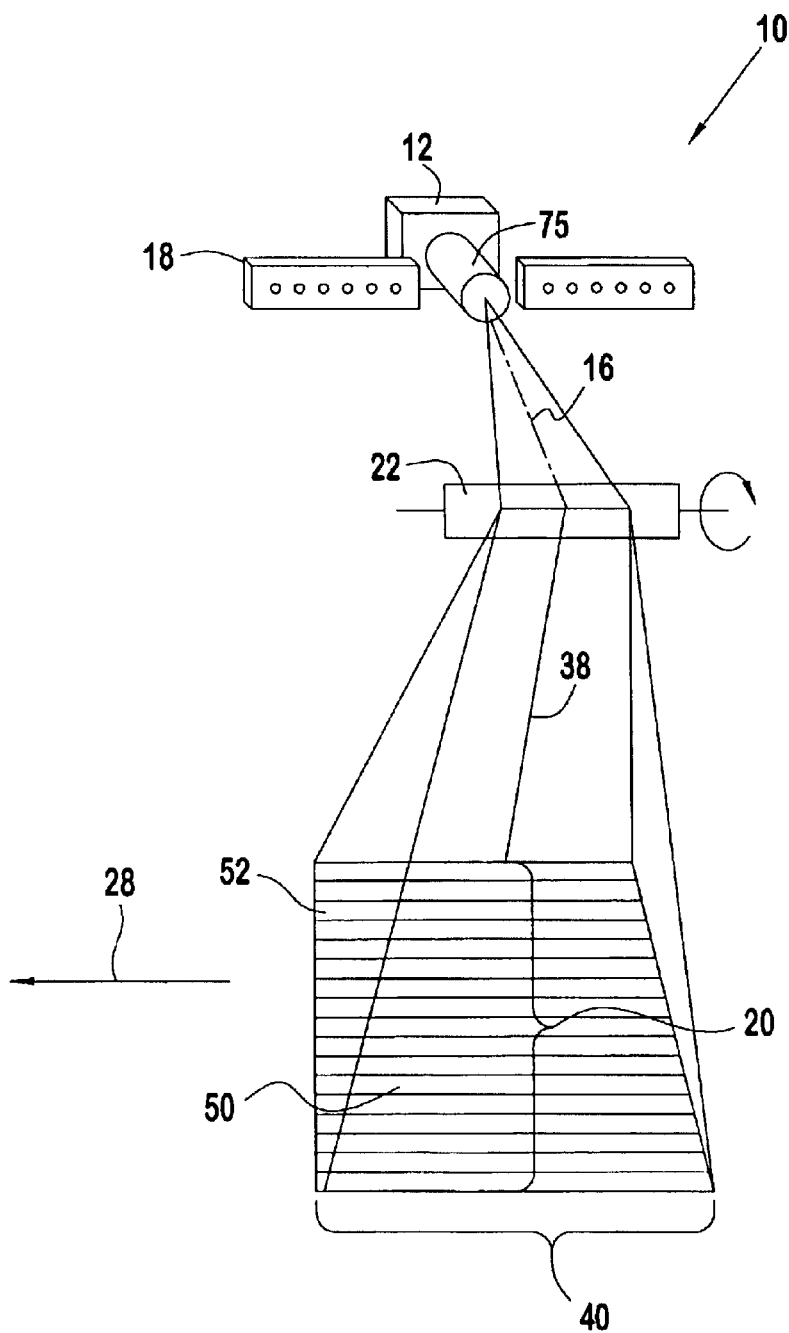
FIG. 2 is a perspective view of the imaging device and sweeping unit of FIG. 1.

Referring to FIGS. 1 and 2, the sweeping unit 22 reflects light generated by the light source 18 from the primary observation path 16 to a secondary observation path 54. The sweeping unit 22 sweeps the illumination across the conveyor 24 along a sweep path 20. The sweeping unit 22 also simultaneously reflects light received from the surfaces of the objects 26,32,34 and conveyor 24 along the sweep path 20 back to the imaging device 12. In this embodiment, the sweeping unit 22 is a mirror that is rotationally connected to a motor or other device for which motion control is commanded by the controller 36. The sweeping unit 22 may also be a rotating mirrored polygon or any other device that is capable of reflecting or refracting light along the sweep path 20.

Figure 3:
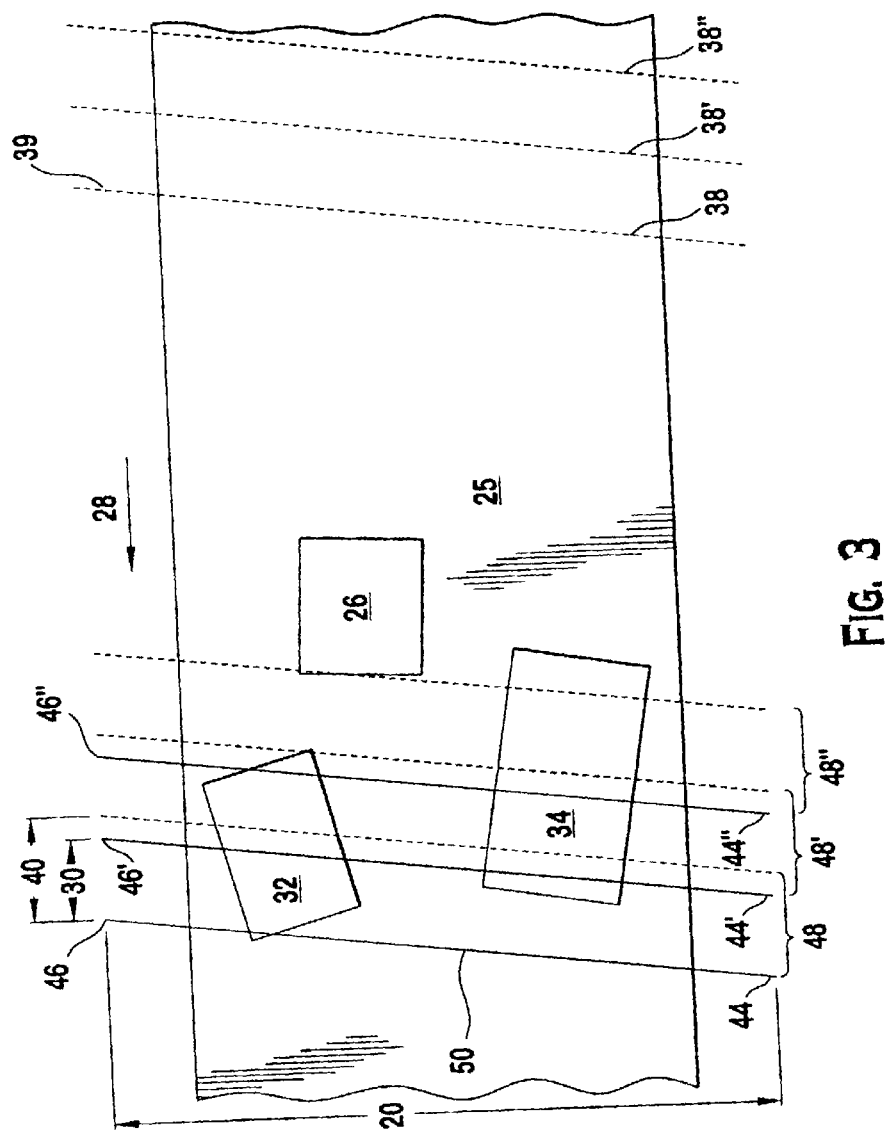
FIG. 3 is a partial top view of scanning sweeps made along the conveyor of FIG. 1.

The sweeping unit 22 performs a sweep by rotating from a first position 23 to a second position 23' about a fixed axis 21, which moves the secondary observation path 54 from a first position 55 to a second position 55' (or from a first position 57 to a second position 57', depending upon the height of the object(s) in the scanning zone) along the sweep path 20 (see FIG. 3). This enables the imaging device 12 to image the entire scanning zone 50 by performing a series of linear (or rectilinear) scans 52 (called a "scanning sweep") to capture successive image segments (see FIG. 2) while the sweeping unit 22 moves from the first position 23 to the second position 23' (see FIG. 1). Those skilled in the art will recognize that the sweep path 20 will be greater than the scan width 40 of the conveyor 24. The length of the sweep path 20 should be chosen so that an object of the maximum height 60 (see FIG. 1) expected to move along the conveyor 24 will be fully contained within the sweep path 20. The length of the sweep path 20 can be varied as objects of different heights pass under the sweeping unit 22. Alternatively, unnecessary portions 56, 58 of the image data collected during a scanning sweep can be discarded based on the height profile data.

In the preferred embodiment, the sweep path 20 is orthogonal to the transport direction 28 of the transport path 25. Those skilled in the art will recognize that the scanning sweep path 20 may be adjusted to perform other directional sweep paths.

Figure 4:
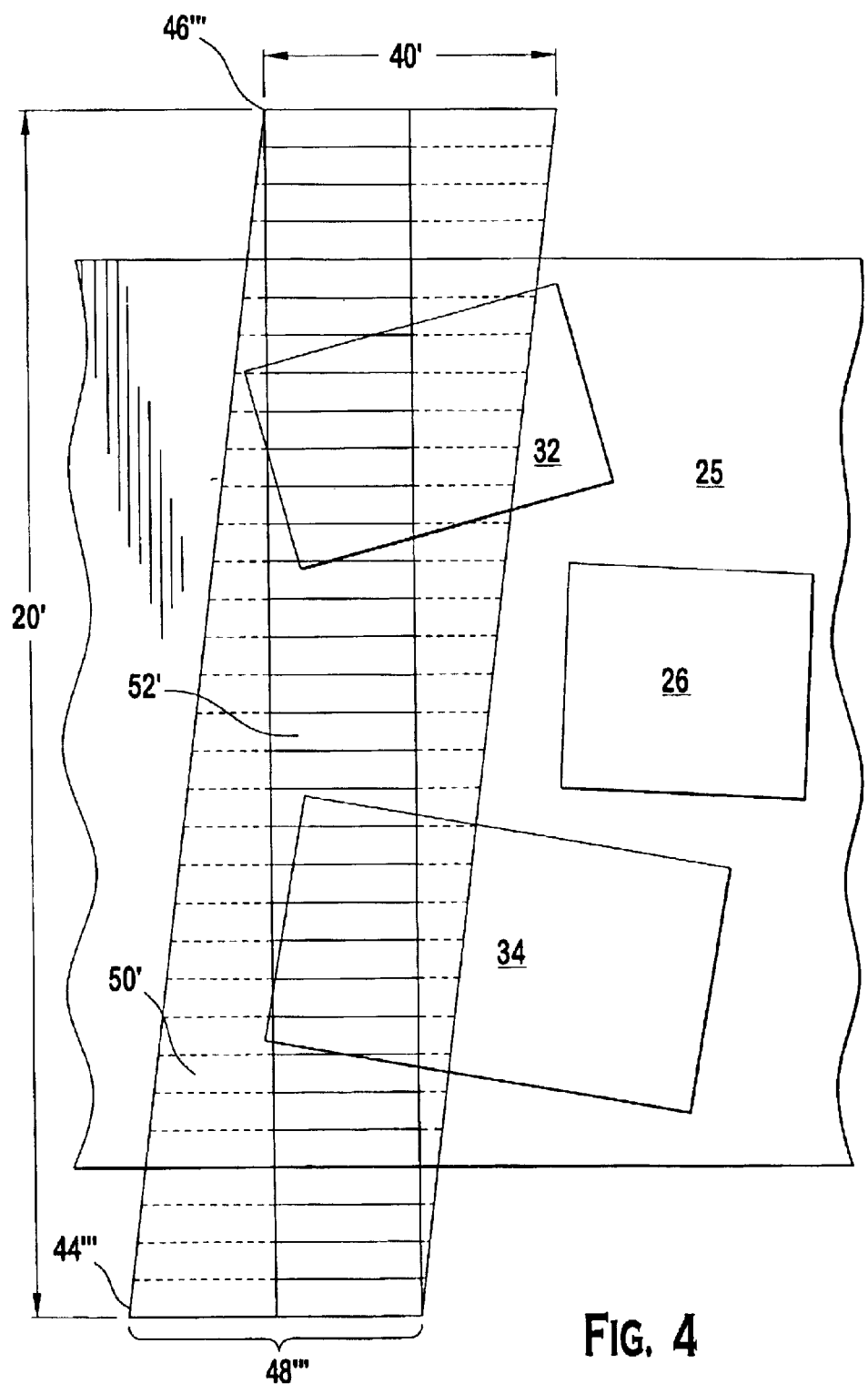
FIG. 4 is an enlarged partial top view of an alternative scanning sweep made along the conveyor of FIG. 1.

Optionally, the sweep path could be slanted (not shown) so that the linear scans 52 are gradually shifted in the transport direction as the sweep progresses, in order to compensate for movement of the transport path 25 during the sweep. Alternatively, as shown in FIG. 4, the imaging device 12 could be configured so that only a portion of its sensor array is passed to the processor 42 during each linear scan 52. As the sweep 48''' moves from the start point 44''' to the end point 46''', the portion of each linear scan 52' that is used would shift in the transport direction 28. Additionally, the speed of the sweep may be performed as an adjustable function determined from the height profile data obtained from the profile unit 80.

FIG. 3 shows an example of three overlapping sweeps 48,48',48'' of the scanning zone 50, performed at a constant interval and all in the same direction. Varied sweep intervals and bi-directional sweeps are also possible. The scanning zone 50 is defined by a width 40 and a sweep path length 20. The width 40 is established by the design of the imaging device 12 and can be varied. In order to maximize the accuracy of the system 10, the width 40 is chosen to minimize height contour variations in the transport direction 28 across each sweep. For example, an application having closely-spaced objects in the transport direction 28 having small top surface areas would require a narrower scanning zone 50 than an application having spaced-apart objects having large top surface areas.

As shown in FIG. 3, the sweeping unit 22 moves in a sweep path 20 progressing from a start point 44 to an end point 46 (corresponding to the first position and second positions 55 and 55', respectively, shown in FIG. 1). While the sweep is being performed, linear scans 52 are performed by the imaging device 12 (see FIG. 2). After a complete sweep is performed from the start point 44 to the end point 46, the individual line scans 52 are assembled to form a two-dimensional image, which is processed for human or machine readable information.

During the sweep from the start point 44 to the end point 46, the objects 32,34 move a distance 30 along the conveyor 24. Once the end point 46 has been reached, a new sweep is initiated starting at a start point 44' and progressing to an end point 46'. The process is repeated again in a third sweep from a start point 44'' to an end point 46''. As noted above, the scan width 40 provides for overlapping (or "shingling") of data between the previous and subsequent sweeps to compensate for area of interest (AOI) boundary conditions. The amount of desired overlap is a function of the size of the localized area of interest (AOI) and the geometry of the objects to be scanned, for example. Non-essential information obtained during scanning such as space between packages, duplicate information from overlapping scans, or out-of-focus scans may be purged if not needed. The resulting overlapping images allow for analysis of non-singulated package movement along the conveyor 24.

The system 10 provides for a great deal of flexibility in dealing with all types of package flow conditions. As discussed above, the profile data is used to control the focusing mechanism 14 so that the focus of the imaging device 12 across the width of the transport path 25 can be dynamically adjusted during each scanning sweep. This allows the present invention to accurately image objects of different heights that fall in a single scanning sweep, which is a characteristic of non-singulated package flow. In FIG. 3 for example, focus control for object 34 is first attained through the profiling device 80 and then as the imaging device 12 progresses further, focus is shifted to that required for object 32.

The profile data may optionally be used to adjust the scanning sweep intervals of the sweeping unit 22 (i.e., sweep rate), the sweep path start point and length, the line scan rate, and the width of each line scan. For example, if the profiling device 80 captures profile data indicating that the transport path has a high level of height profile variation in the transport direction 28 with closely-spaced objects each having small top surface areas, the controller would signal the imaging device 12 and sweeping unit 22 to operate at a relatively narrow line scan width and relatively closely-spaced scanning sweep intervals, respectively.

Linear scanning and scanning sweeps can optionally be activated or deactivated based upon the height profile data provided by the profiling device 80. For instance, the sweeping unit 22, imaging device 12 and light source 18 could be deactivated during times in which the controller 36 determines that no objects are in the scanning zone 50.

The speed of the transport path 25 could even be varied as a function of the height profile data. For example, the controller 36 could slow the conveyor 24 if the profiling device 80 detected a large number of closely-spaced objects on the transport path 25 to accommodate image lift requirements.

Alternatively, any one or all of the features described in the preceding four paragraphs could be constant.

The system 10 also allows the flexibility of choosing pixels obtained from line scans and within the sweeps for use in processing. Such choosing of pixels may allow for close analysis of individual sections of an image segment for more efficient processing as well as compensation for object motion during a sweep performed by the system 10.

While the preferred embodiments of the invention have been described in detail, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A system for scanning human or machine readable information located on objects moving in a transport direction along a transport path having a width, the system comprising:
    a profiling device that provides a height profile of the objects moving along the transport path;
    an imagine device having a first observation path and an automatic focusing system;
    a controller in communication with the profiling device to transmit the height profile;
    a scanning zone located along the transport path;
    a processor in communication with the imaging device and profiling device; and
    a sweeping unit positioned to receive light from the scanning zone along a second observation path and to reflect the light along the first observation path to the imaging device;
    wherein the sweeping unit moves such that the second observation path moves through the scanning zone along a sweep path, the imaging device captures a plurality of image segments that extend generally across the transport path at a scan rate that is controlled by the controller as a function of the height profile, and the controller signals the focusing system to adjust the focusing system as a function of the height profile as the sweeping unit moves along the sweep path.

2. The system of claim 1, wherein the height profile comprises the height characteristics of the objects located along a predetermined plane that spans the width of the transport path.

3. The system of claim 1, wherein the scanning zone includes a length that is equal to or greater than the width of the transport path.

4. The system of claim 1, wherein the sweeping unit rotates about a first axis parallel to the transport direction.

5. The system of claim 1, further comprising a speed-measuring device to provide the speed of the objects moving in the transport direction.

6. The system of claim 1, wherein the imaging device is a line scan imager.

7. The system of claim 1, wherein the sweeping unit is a mirror.

8. The system of claim 1, wherein the sweeping unit is a rotating mirrored polygon.

9. The system of claim 1, further comprising an illumination device that illuminates the scanning zone.

10. The system of claim 9, wherein the illumination device produces illumination co-axial to the first observation path.

11. The system of claim 1, wherein the processor evaluates the image segments for human or machine readable information.

12. The system of claim 1, wherein the imaging device selectively scans portions of the sweep path in which the objects are detected by the profiling device.

13. The system of claim 1, wherein each of the plurality of image segments has a scan width that is controlled by the controller as a function of the height profile.

14. The system of claim 1, wherein movement of the sweeping unit through the scanning zone is controlled by the controller as a function of the height profile.

15. The system of claim 1, wherein the sweep path includes a length that is controlled by the controller as a function of the height profile.

* * * * *

UNITED STATES PATENT AND TRADEMARK OFFICE
CERTIFICATE OF CORRECTION

PATENT NO. : 6,749,110 B2 Page 1 of 1
APPLICATION NO. : 10/188571
DATED : June 15, 2004
INVENTOR(S) : Kurt Hecht It is certified that error appears in the above-identified patent and that said Letters Patent is hereby corrected as shown below:

In claim 1, at column 6, line 40, after the word "an", delete "imagine" and insert therefor -- imaging --.

Signed and Sealed this

Fifteenth Day of August, 2006

JON W. DUDAS
*Director of the United States Patent and Trademark Office*